United States Patent
Lindrose

[11] Patent Number: 5,880,906
[45] Date of Patent: Mar. 9, 1999

[54] DISC CLAMP WITH CONTOURED PERIPHERAL WALL HEIGHT

[75] Inventor: Albert Michael Lindrose, Boulder, Colo.

[73] Assignee: Seagate Technology, Inc., Scotts Valley, Calif.

[21] Appl. No.: 931,924

[22] Filed: Sep. 17, 1997

Related U.S. Application Data

[60] Provisional application No. 60/027,427, Dec. 5, 1996 and provisional application No. 60/027,428, Dec. 5, 1996.

[51] Int. Cl.[6] .................................................. G11B 17/08
[52] U.S. Cl. ........................................................ 360/98.08
[58] Field of Search .............................. 360/98.08, 99.12

[56] References Cited

U.S. PATENT DOCUMENTS

| | | | |
|---|---|---|---|
| 5,528,434 | 6/1996 | Bronshvatch | 360/98.08 |
| 5,590,004 | 12/1996 | Boutaghou | 360/98.08 |

*Primary Examiner*—A. J. Heinz
*Attorney, Agent, or Firm*—Edward P. Heller, III; Raghunath S. Minisandram

[57] ABSTRACT

A disc clamp with a varying peripheral wall height at its outermost diameter. Variation of the peripheral wall height results in a circumferentially varying stiffness modulus of the disc clamp at specific circumferential positions relative to the position of multiple mounting screws which attach the central mounting portion of the disc clamp to the spindle motor hub. Varying the stiffness modulus of the disc clamp circumferentially results in even distribution of the clamping force about the contact surface of the disc clamp.

28 Claims, 4 Drawing Sheets

DISC CLAMP WITH CONTOURED PERIPHERAL WALL HEIGHT

CROSS REFERENCE TO RELATED APPLICATIONS

This application claims the benefit of U.S. provisional applications Ser. No. 60/027,427 and Ser. No. 60/027,428, both filed Dec. 5, 1996, abandoned and is related to U.S. patent application Ser. No.08/332752, filed simultaneously with this application.

FIELD OF THE INVENTION

This invention relates generally to the field of hard disc drive data storage devices, and more particularly, but not by way of limitation, to an improved disc clamp for securing the discs of the disc drive to the hub of the spindle motor used to rotate the discs.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which are used wherever their users happen to take them. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding mechanical shocks of 100 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that provides sufficient clamping force to prevent shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Pat. Nos., including U.S. Pat. No. 5,528,434, issued Jun. 18, 1996, U.S. Pat. No. 5,517,376, issued May 14, 1996, U.S. Pat. No. 5,452,157, issued Sep. 19, 1995, U.S. Pat. No. 5,333,080, issued Jul. 26, 1994, U.S. Pat. No. 5,274,517, issued Dec. 28, 1993 and U.S. Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

One type of disc clamp which is used extensively in the industry is the so-called "spring-type" clamp. A spring-type clamp is typically formed of sheet material stamp-formed to provide both mounting and force-application features, and commonly consists of three major portions: 1) a central mounting portion; 2) a spring portion extending radially outward from the central mounting portion and; 3) a contact portion adjacent the outer diameter of the spring-type clamp.

The central mounting portion, also sometimes referred to as a web, typically includes one or more screw holes through which machine screws are inserted into corresponding tapped holes in the upper surface of the spindle motor hub. It is also typical for the web to include an arrangement of tooling holes, aligned with corresponding tooling holes in the upper surface of the spindle motor hub, which are engaged by an assembly tool to maintain the relative position of the spindle motor and disc clamp while the screws used to mount the disc clamp are tightened.

The radially extending spring portion is commonly formed at an angle to the plane of the central mounting portion of the disc clamp, and acts, when the web is displaced into contact with the top of the spindle motor hub, similarly to a "belleville" spring to determine the amount of clamping force applied to the top surface of the uppermost disc in the disc stack.

The contact portion of a typical spring-type disc clamp is a circumferentially formed corrugation at the outermost extent of the spring portion. The corrugation is first formed downward, toward the disc surface, and then back upward, thus forming a contact portion which is substantially circular in section at a fixed diameter from the spin axis of the disc stack, and producing a perimeter wall at the outer extreme of the disc clamp.

While spring-type disc clamps have been seen which employ a single, centrally located mounting screw, it is much more common to utilize a plurality of screws evenly spaced about a diameter just inside the outer diameter of the web portion of the disc clamp. The use of multiple mounting screws placed close to the spring portion provides greater overall clamping force than a single central mounting screw, given the same configuration of the remainder of the disc clamp.

One typical drawback to the use of multiple mounting screws for the disc clamp is uneven distribution of the clamping force between locations radially aligned with the mounting screws and those portions of the disc clamp contact surface lying circumferentially between adjacent screw locations. For example, such a disc clamp often produces the greatest contact surface stress on the top disc surface at the same angular locations as the screw positions. This is especially true in disc clamp designs that have a web that is substantially free of secondary holes, openings or cutouts.

In disc clamp designs that do have secondary openings, the openings can direct the load concentrations away from the angular position of the screws to angular locations at the contact surface other than at the angular positions of the screws.

In any case, if the stress at the contact surface is localized, those locations at the contact surface where the load stress is not concentrated can experience a significantly lower contact force, in some clamp designs even approaching zero force.

The end result is that the circumferentially varying contact surface stress introduces an associated circumferential waviness into the uppermost disc in the disc stack that is most severe near the inner diameter clamping area, but which may possibly extend over the entire disc surface. Such waviness in the disc surface can have a major impact on the flying characteristics of the heads, particularly if the wave length of the disc distortion is of the same scale as the length of the slider used to support the read/write transducer.

Previously incorporated U.S. Pat. No. 5,333,080, U.S. Pat. No. 5,528,434 and U.S. Pat. No. 5,517,376 are each specifically directed to improving the distribution of clamping force provided by spring-type disc clamps using multiple mounting screws, and the resultant reduction in mechanical distortion of the discs, particularly the top disc, in the disc stack. U.S. Pat. No. 5,333,080 also requires, however, the inclusion of a shim between the disc clamp and the spindle motor hub, which increases part count in the disc drive, adds to assembly complexity, and adds an otherwise non-functional element to the overall vertical height of the disc stack.

Similarly, U.S. Pat. No. 5,517,376 requires the inclusion of specially formed components and additional assembly adjustments in order to achieve even distribution of disc clamping forces.

U.S. Pat. No. 5,528,434 achieves even distribution of disc clamping force by including an additional circumferential bend in the disc clamp between the central mounting portion and the circular contact surface at the outer extent of the spring member. While each of these prior art disc clamping systems achieves improvement in the distribution of disc clamping forces, they each require either the inclusion of additional components—and potentially increases in the height requirement of the clamping system—or an increase in the complexity of the forming of the disc clamp after the unformed disc clamp is excised from flat spring stock.

A need clearly exists, therefore, for a disc clamping system which provides an even distribution of the clamping force applied to the disc stack to prevent mechanical distortion of the discs.

SUMMARY OF THE INVENTION

The present invention is a disc clamp with a varying peripheral wall height at its outermost diameter. Variation of the peripheral wall height results in a circumferentially varying stiffness modulus of the disc clamp at specific circumferential positions relative to the position of multiple mounting screws which attach the central mounting portion of the disc clamp to the spindle motor hub. Varying the stiffness modulus of the disc clamp circumferentially results in even distribution of the clamping force about the contact surface of the disc clamp.

It is an object of the invention to provide a disc clamp for securing the discs to a spindle motor in a disc drive.

It is another object of the invention to provide a disc clamp that evenly distributes the clamping force of the disc clamp about the circumferential contact surface between the disc clamp and the upper surface of the top disc in a disc stack.

It is another object of the invention to provide a disc clamp which can be manufactured with minimal impact on cost of manufacture.

The manner in which these objects are achieved, as well as other features and benefits of the invention, can best be understood by a review of the following DETAILED DESCRIPTION OF THE INVENTION, when read in conjunction with an examination of the accompanying drawings.

DETAILED DESCRIPTION OF THE INVENTION

Figure 1:
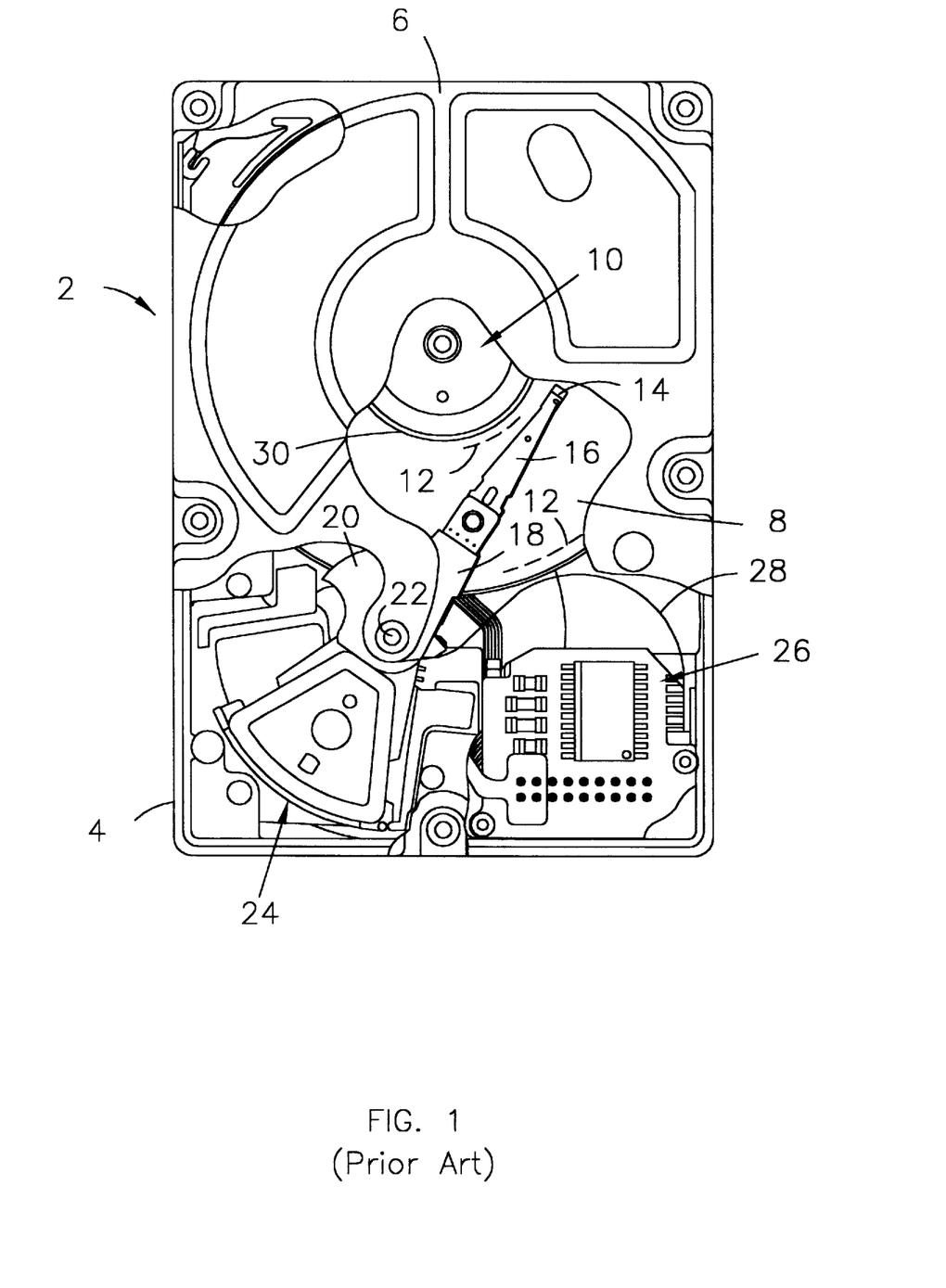
FIG. 1 is a top plan view of a disc drive in which the present invention is particularly useful.

Turning now the drawings and specifically to FIG. 1, shown is a plan view of a disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

The disc clamp 30 used to secure the discs 8 is also shown the FIG. 1.

Figure 2:
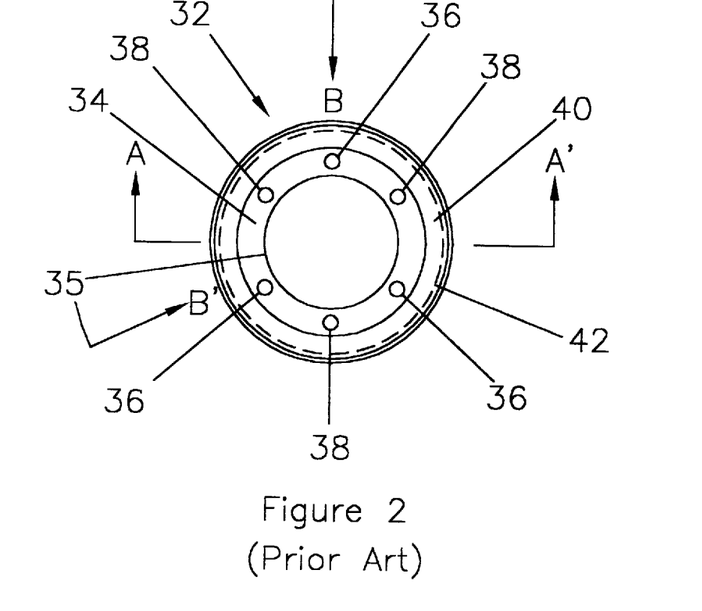
FIG. 2 is a top plan view of a typical prior art disc clamp.

Turning now to FIG. 2, shown is a plan view of a typical prior art disc clamp 32 which uses a plurality of screws for mounting to the hub (not shown) of the spindle motor. In the figure, it can be seen that the disc clamp 32 includes a central mounting portion, or web 34, which is dimensioned to overlay the top surface of the spindle motor hub, and which includes a central opening 35. This web includes a plurality of screw holes 36 through which screws (not shown) are inserted and screwed into corresponding tapped holes in the upper surface of the spindle motor hub. In the example prior art disc clamp shown in the figure, there are three screw holes 36. A person of skill in the art will realize, however, that the number of screws used to mount the disc clamp 32 will be dependent on design requirements.

FIG. 2 also shows a plurality of tooling holes 38 in the web 34 of the disc clamp 32. These tooling holes 38 align with similarly spaced tooling holes in the spindle motor hub and are used with an assembly tool (not shown) during the manufacturing process to hold the disc clamp 32 in alignment with the spindle motor hub and prevent the spindle motor from rotating while the screws used to secure the disc clamp are tightened, all in a manner well known in the art.

In FIG. 2, it can also be seen that the disc clamp 32 includes a spring portion 40 extending radially outward from the web 34 to a circular contact surface, represented by dashed line 42. The configuration of the spring portion 40 and contact surface 42 can perhaps best be appreciated from an examination of FIG. 3.

Figure 3:
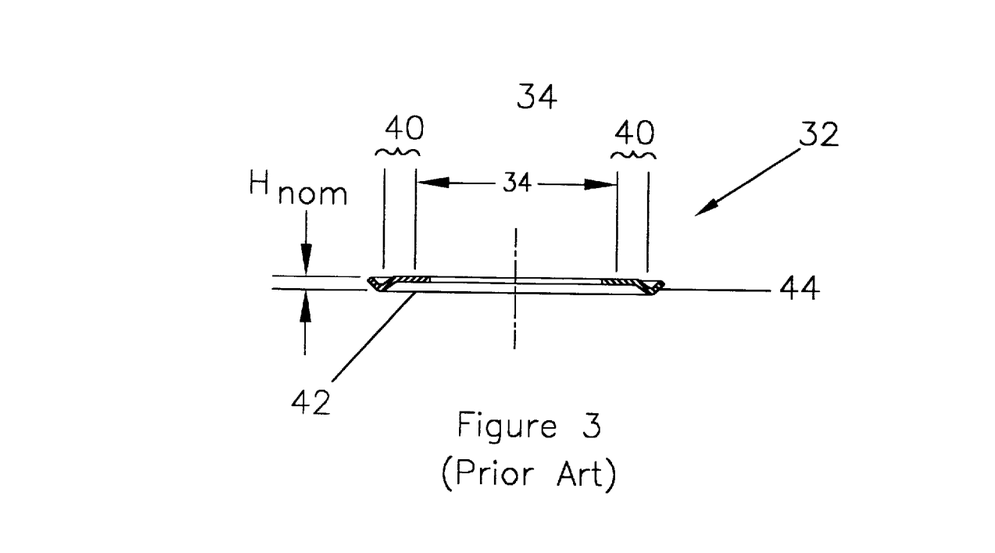
FIG. 3 is a sectional elevation view of the prior art disc clamp of FIG. 2 taken along line A–A' of FIG. 2.

FIG. 3 is a sectional elevation view of the prior art disc clamp 32 of FIG. 2 taken along line A–A' of FIG. 2. In the figure, it can be seen that the web 34 forms a substantially flat central region, and that the spring portion 40, extending from the outer extent of the web 34 to the circular contact surface 42, is formed out-of-plane from the web 34. In actual practice, the vertical dimension from the bottom of the web 34 to the contact surface 42 will be greater by some selected amount than the vertical height from the top surface of the uppermost disc in the disc stack to the top surface of the spindle motor hub. Thus, when screws are inserted through the screw holes (36 in FIG. 2) and tightened into engagement with corresponding tapped holes in the spindle motor hub, the web 34 will be displaced downward relative to the contact surface 42, deforming the spring portion 40 and applying clamping force to the uppermost disc along the circular contact surface 42 of the disc clamp 32.

In FIG. 3 it can also be seen that the outer rim 44 of the disc clamp 32 is bent upward from the contact surface 42 and forms a peripheral wall 44 or outer rim, which extends to a constant nominal height, $H_{nom}$, above the contact surface 42. This upward bending of the outer rim 44 of the disc clamp 32 adds stiffness-to the outer periphery of the disc clamp 32. However, the constant height, $H_{nom}$, of the outer wall 44 of the disc clamp 32 means that the additional stiffness imparted is also evenly distributed around the entire circumference of the disc clamp 32. The effect of this equal distribution of stiffness coupled with the localized application of clamping force at the screw holes (36 in FIG. 2) is shown in FIG. 4.

Figure 4:
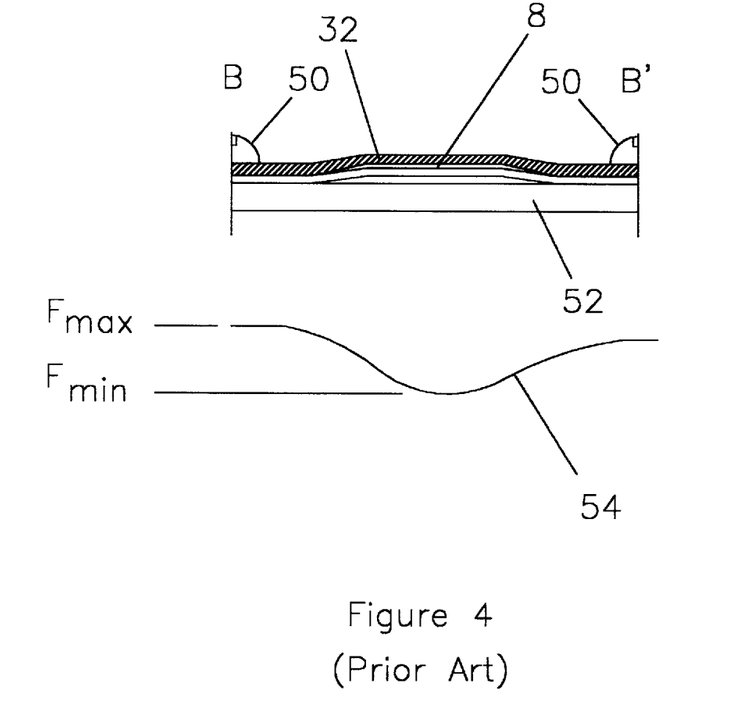
FIG. 4 is a linear elevation view of the prior art disc clamp of FIGS. 2 and 3 and an associated disc and disc spacer, taken along arrows B–B' of FIG. 2, along with a graphical representation of the clamping force applied to the disc.

FIG. 4 is a linear representation of the angular portion of a disc clamp 32, such as that of FIGS. 2 and 3, which lies between adjacent screw holes. In the example disc clamp 32 of FIGS. 2 and 3, there are three such screw holes distributed 120° apart around the web 34 of the disc clamp 32. Thus the view of FIG. 4 is representative of 20 that portion of the disc clamp defined by lines B–B' in FIG. 2.

FIG. 4 shows that the screws 50 used to secure the disc clamp 32 are located at positions corresponding to lines B and B' in FIG. 2, and that the screws 50 capture the uppermost disc 8 between the contact surface (not designated in FIG. 4) of the disc clamp 32 and a disc spacer 52 which forms a part of the disc stack in a manner well known to those of skill in the art. It will also be apparent to a person of skill in the art that, if the disc drive includes only a single disc, the disc spacer is the equivalent of a radially extending disc flange on the lower end of the spindle motor hub.

At the lower portion of FIG. 4 is a curve 54 representative of the clamping force applied by the screws 50 as a function of the circumferential position represented in the upper portion of the figure. As can be seen in the figure, the amount of clamping force varies from a maximum value, $F_{max}$, at locations radially aligned with the screws 50 to a minimum value, $F_{min}$, at locations midway between the screws 50. This is representative of the fact that the clamping force is expressed radially outward from the location of the screws 50 to corresponding locations at the contact surface of the disc clamp, and that the stiffness at the outer extent of the disc clamp is evenly distributed, as would be the case with a disc clamp having an perimeter wall with a constant height, such as the nominal height, $H_{nom}$, shown in FIG. 3.

FIG. 4 exaggerates the effect of this uneven distribution of clamping force, and shows the disc clamp 32 and disc 8 actually being out of contact at locations midway between the screws 50. This exaggeration is for illustrative purposes only, and is not intended to show the conditions actually present in a properly designed disc drive clamping system. The varying amount of clamping force, however, is a consequence of such a disc drive clamping system.

While FIG. 4 shows that the maximum amount of clamping force is exerted at the contact surface at locations radially outward of the mounting screws, the presence of tooling holes, such as the tooling holes 38 in FIG. 2, and central openings, such as the central opening 35 of FIG. 2, and other openings in the web of the disc clamp can alter the overall stiffness characteristics of the disc clamp and cause the locations of maximum and minimum clamping force application to be displaced from directly radially outward from the screws 50. Thus, as will be appreciated by those of skill in the art, FIG. 4 serves only as an example of uneven clamping force distribution. The present invention is capable, in combination with proper engineering practices, of overcoming such uneven clamping force distribution regardless of the location and number of points of maximum and minimum clamping force application, as will be explained below.

Figure 5:
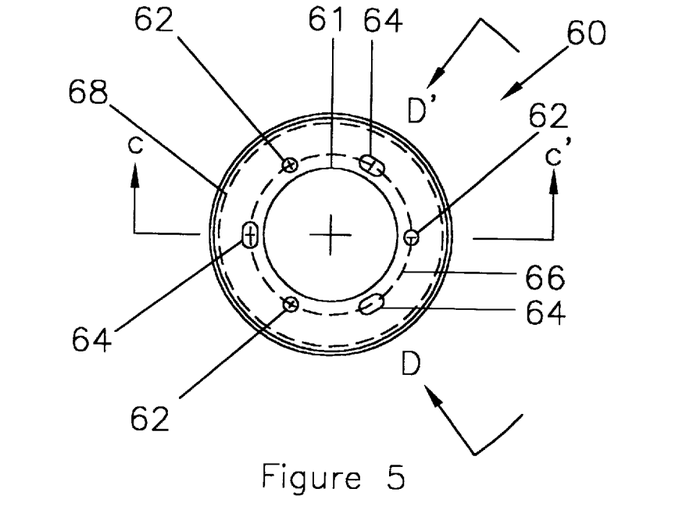
FIG. 5 is a plan view of a disc clamp made in accordance with the present invention.

Turning now to FIG. 5, shown is a plan view of a disc clamp 60 made in accordance with the present invention. As can be seen from the figure, the plan view of FIG. 5 is very similar to that of the prior art of FIG. 2.

The disc clamp 60 includes a central opening 61, and a plurality of screw holes 62 and tooling holes 64 lying on a common diameter 66. While in the example disc clamp 60 there are three screw holes 64 and three tooling holes 64, the person of skill in the art will appreciate that the scope of the present invention is not limited by the specific number of screw holes 62 or tooling holes 64, and is envisioned to include embodiments with various numbers of such openings.

The disc clamp 60 of FIG. 5 is also formed near its outer perimeter similarly to the prior art disc clamp of FIGS. 2 and 3. That is, a circular corrugation is formed near the outer diameter of the disc clamp 60 which creates a circular contact surface, represented in FIG. 5 by dashed line 68. The differences envisioned by the present invention are perhaps best seen in FIGS. 6 and 7.

Figure 6:
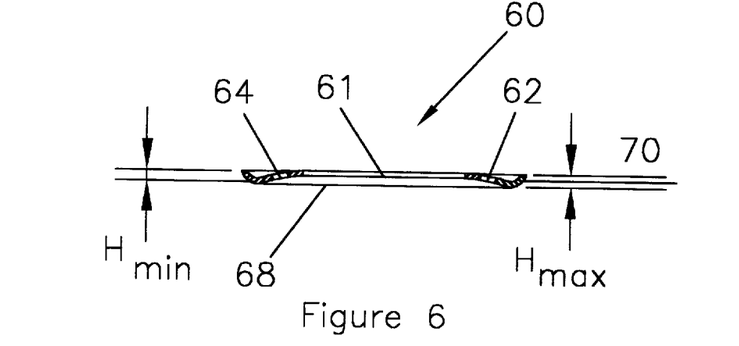
FIG. 6 is a sectional elevation view of the disc clamp of FIG. 5 taken along line C–C' of FIG. 5.

FIG. 6 is a sectional elevation view of the disc clamp 60 of FIG. 5 taken along line C–C' of FIG. 5. In FIG. 6, it is apparent that the disc clamp 60 is formed into the shape of a low angle truncated cone from the central opening 61 outward. That is, the material of the disc clamp 60 is formed downward out-of-plane from the central opening 61 to the peripheral circular corrugation that forms the circular contact surface 68.

The outermost extreme of the disc clamp 60 is formed upward from the contact surface 68 to form a perimeter wall 70 that, similar to the configuration of FIGS. 2 and 3, serves to stiffen the disc clamp 60 near its outer edge. The present invention is implemented in the specific configuration of the perimeter wall 70 of the disc clamp 60.

The embodiment of the present invention shown in FIG. 6 assumes that previous evaluation of the disc clamp configuration, such as a finite element analysis, has determined that the particular combination of screw hole number and location, tooling hole number and location and size of central opening requires that additional stiffness be provided at those locations on the contact surface 68 directly radially outward of the locations of the screw holes 62, while minimal stiffness is required at those locations radially outward from the tooling holes 64.

In order to achieve this varying stiffness around the circumference of the disc clamp 60, the present invention envisions that the height of the perimeter wall 70 be varied accordingly. That is, the perimeter wall has a maximum height, $H_{max}$, at locations radially aligned with the screw holes 62, as seen at the right of FIG. 6, and a minimum height, $H_{min}$, at locations radially aligned with the tooling holes 64 which are located midway between adjacent screw holes 62, as seen at the left side of FIG. 6.

In a specific implementation of the invention, a disc clamp for a 3.5" disc drive was fabricated from series 301 half-hardened stainless steel 0.0177"±0.0005" thick. The disc clamp was designed with a large central opening 61, three screw holes 62 and three tooling holes 64, such as that shown in FIG. 5. At those locations radially outward of the screw holes 62, the height of the perimeter wall was increased 0.021 inches (twenty-one milli-inches) above the minimal perimeter wall height radially opposite the tooling holes 64. The minimal perimeter wall height was maintained over an angular range of approximately 5.2 degrees to either side of the circumferential location of the tooling holes, and varied from the minimal height to the maximum height in a linear manner. This perimeter wall height variation is perhaps best seen in FIG. 7.

Figure 7:
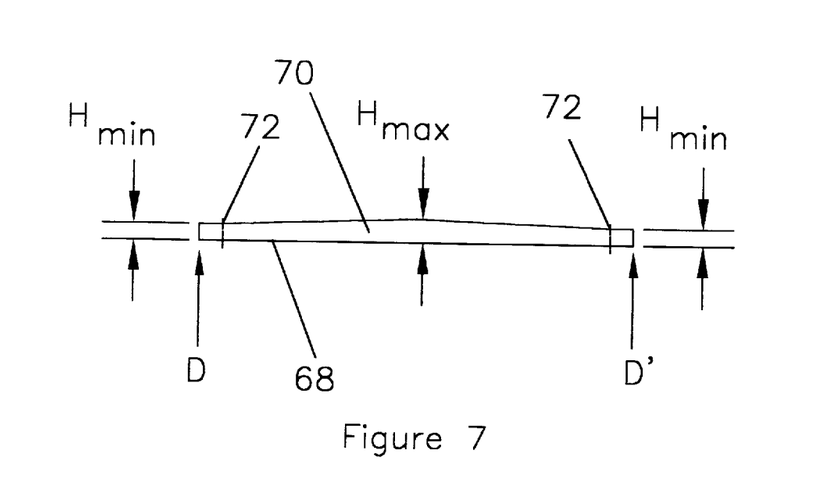
FIG. 7 is a linear elevation view of a portion of the outer diameter of the disc clamp of FIGS. 5 and 6 taken along line D–D' of FIG. 5.

FIG. 7 is a linear representation of the arc segment of the perimeter wall 70 lying between adjacent tooling holes (64 in FIG. 5) as it is configured in the disc clamp of the present invention. Since the example disc clamp 60 of FIG. 5 includes three tooling holes equally spaced about a diameter 66 of the disc clamp, FIG. 7 represents a 120° arc segment of the perimeter wall 70, such as that portion of the perimeter wall designated by lines D–D' in FIG. 5. The location of the screw hole 62 lying between the tooling holes at arrows D and D' is therefore at the midpoint of the projection of FIG. 7.

In FIG. 7 it can be seen that the contact surface 68 is flat, and that the height of perimeter wall is minimal, $H_{min}$, at the locations radially opposite the tooling holes (64 in FIG. 5), and increases to a maximum height, $H_{max}$, at the midpoint of the arc segment at a location radially opposite the screw hole (62 in FIG. 5). Once again, in analysis of an actual disc clamp for a 3.5" disc drive, it was found that optimum distribution of clamping force was achieved when the minimum perimeter wall height, $H_{min}$, was maintained over an area extending from a point directly radially opposite the tooling holes, such as points D and D' in FIG. 7, to points 72 lying approximately 5.2° to either side of the tooling hole locations, and then extending in a linear manner to the maximum perimeter wall height, $H_{max}$, at a point radially outward of the screw hole 62. Again, it should be recalled that this configuration of the variation of perimeter wall height is based on analysis of the particular combination of openings present in the central portion of the disc clamp, and that different combinations of web openings (central openings, screw holes, tooling holes) would be expected to require comparably differing height profiles at the perimeter wall. The present invention is envisioned to encompass disc clamps which differ from the example disc clamp shown in, for instance, the location of the minimum and maximum wall heights, the number of points of minimum and maximum perimeter wall height, the difference between the minimum and maximum perimeter wall height, the circumferential extent of each point of minimum and maximum perimeter wall height and the manner in which the perimeter wall height varies from minimum to maximum. As examples, the perimeter wall height can be varied in a linear manner, in a stepped manner or in conjunction with either simple or complex curves.

The variation of peripheral wall height envisioned by the present invention can be readily achieved by controlling the die used to excise the disc clamp from flat sheet stock, and thus, once the appropriate die has been designed and fabricated, introduces no additional manufacturing costs. Furthermore, since the disc clamp of the present invention requires no additional parts or assembly steps over disc clamping systems of the prior art, the advantages described above are achieved without adding any additional costs to the manufacturing process.

From the foregoing, it is apparent that the present invention is particularly well suited and well adapted to achieve the objects set forth hereinabove, as well as possessing other advantages inherent therein. While a particular configuration of the present invention has been disclosed as an example embodiment, certain variations and modifications which fall within the envisioned scope of the invention may be suggested to one of skill in the art upon reading this disclosure. Therefore, the scope of the present invention should be considered to be limited only by the following claims.

What is claimed is:

1. A disc drive including a disc stack mounted for rotation on a hub of a spindle motor, the disc stack comprising at least one uppermost disc, the disc drive including a disc clamping system for securing the disc stack to the hub of the spindle motor, the disc clamping system comprising:
    a plurality of tapped holes in the upper surface of the spindle motor hub,
    a disc clamp comprising:
        a plurality of screw holes arranged for cooperation with the tapped holes in the spindle motor hub,
        a circular corrugation closely adjacent the outer diameter of the disc clamp, the circular corrugation forming
            a circular contact surface for engaging the uppermost disc, and
            a peripheral wall extending upward from the contact surface, the peripheral wall having a circumferentially varying height, and
    a plurality of screws passing through the screw holes in the disc clamp and into engagement with the tapped holes in the spindle motor hub.

2. A disc drive as claimed in claim 1 wherein the circumferentially varying peripheral wall height includes a minimum peripheral wall height, $H_{min}$, and a maximum peripheral wall height, $H_{max}$.

3. A disc drive as claimed in claim 2 wherein the circumferentially varying peripheral wall height varies in a linear manner between the minimum peripheral wall height and the maximum peripheral wall height.

4. A disc drive as claimed in claim 2 wherein the minimum peripheral wall height and maximum peripheral wall height are each located at multiple positions about the circumference of the disc clamp.

5. A disc drive as claimed in claim 4 wherein the circumferentially varying peripheral wall height varies in a linear manner between positions of minimum peripheral wall height and positions of maximum peripheral wall height.

6. A disc drive as claimed in claim 2 wherein the maximum peripheral wall height occurs at those locations on the perimeter wall radially outward from the positions of the screw holes, and the minimum peripheral wall height occurs at locations on the perimeter wall midway between the locations of maximum peripheral wall height.

7. A disc drive as claimed in claim 6 wherein the circumferentially varying peripheral wall height varies in a linear manner between positions of minimum peripheral wall height and positions of maximum peripheral wall height.

8. A disc drive including a disc stack mounted for rotation on a hub of a spindle motor, the disc stack comprising at least one uppermost disc, the disc drive including a disc clamping system for securing the disc stack to the hub of the spindle motor, the disc clamping system comprising:
    a plurality of tapped holes in the upper surface of the spindle motor hub,
    a disc clamp comprising:
        a plurality of screw holes arranged for cooperation with the tapped holes in the spindle motor hub,
        a circular corrugation closely adjacent the outer diameter of the disc clamp, the circular corrugation forming
            a circular contact surface for engaging the uppermost disc, and
            a peripheral wall extending upward from the contact surface, the peripheral wall having a height which varies circumferentially relative to the location of the screw holes, and
    a plurality of screws passing through the screw holes in the disc clamp and into engagement with the tapped holes in the spindle motor hub for applying a clamping force to the uppermost disc,
    whereby the varying peripheral wall height serves to evenly distribute the clamping force applied by the plurality of screws to the uppermost disc.

9. A disc drive as claimed in claim 8 wherein the circumferentially varying peripheral wall height includes a minimum peripheral wall height, $H_{min}$, and a maximum peripheral wall height, $H_{max}$.

10. A disc drive as claimed in claim 9 wherein the circumferentially varying peripheral wall height varies in a linear manner from the minimum peripheral wall height to the maximum peripheral wall height.

11. A disc drive as claimed in claim 9 wherein the minimum peripheral wall height and maximum peripheral wall height are each located at multiple positions about the circumference of the disc clamp.

12. A disc drive as claimed in claim 11 wherein the circumferentially varying peripheral wall height varies in a linear manner between positions of minimum peripheral wall height and positions of maximum peripheral wall height.

13. A disc drive as claimed in claim 9 wherein the maximum peripheral wall height occurs at those locations on the perimeter wall radially outward from the positions of the screw holes, and the minimum peripheral wall height occurs at locations on the perimeter wall midway between the locations of maximum peripheral wall height.

14. A disc drive as claimed in claim 13 wherein the circumferentially varying peripheral wall height varies in a linear manner between positions of minimum peripheral wall height and positions of maximum peripheral wall height.

15. A disc clamping system for securing discs in a disc drive to a hub of a spindle motor, the disc clamping system comprising:
   a plurality of tapped holes in the upper surface of the spindle motor hub,
   a disc clamp comprising:
      a plurality of screw holes arranged for cooperation with the tapped holes in the spindle motor hub,
      a circular corrugation closely adjacent the outer diameter of the disc clamp, the circular corrugation forming
         a circular contact surface for engaging a disc, and
         a peripheral wall extending upward from the contact surface, the peripheral wall having a circumferentially varying height, and
   a plurality of screws passing through the screw holes in the disc clamp and into engagement with the tapped holes in the spindle motor hub.

16. A disc clamping system as claimed in claim 15 wherein the circumferentially varying peripheral wall height includes a minimum peripheral wall height, $H_{min}$, and a maximum peripheral wall height, $H_{max}$.

17. A disc clamping system as claimed in claim 16 wherein the circumferentially varying peripheral wall height varies in a linear manner from the minimum peripheral wall height to the maximum peripheral wall height.

18. A disc clamping system as claimed in claim 16 wherein the minimum peripheral wall height and maximum peripheral wall height are each located at multiple positions about the circumference of the disc clamp.

19. A disc clamping system as claimed in claim 18 wherein the circumferentially varying peripheral wall height varies in a linear manner between positions of minimum peripheral wall height and positions of maximum peripheral wall height.

20. A disc clamping system as claimed in claim 16 wherein the maximum peripheral wall height occurs at those locations on the perimeter wall radially outward from the positions of the screw holes, and the minimum peripheral wall height occurs at locations on the perimeter wall midway between the locations of maximum peripheral wall height.

21. A disc clamping system as claimed in claim 20 wherein the circumferentially varying peripheral wall height varies in a linear manner between positions of minimum peripheral wall height and positions of maximum peripheral wall height.

22. A disc clamping system for securing discs in a disc drive to a hub of a spindle motor, the disc clamping system comprising:
   a plurality of tapped holes in the upper surface of the spindle motor hub,
   a disc clamp comprising:
      a plurality of screw holes arranged for cooperation with the tapped holes in the spindle motor hub,
      a circular corrugation closely adjacent the outer diameter of the disc clamp, the circular corrugation forming
         a circular contact surface for engaging a disc, and
         a peripheral wall extending upward from the contact surface, the peripheral wall having a height which varies circumferentially relative to the location of the screw holes, and
   a plurality of screws passing through the screw holes in the disc clamp and into engagement with the tapped holes in the spindle motor hub for applying a clamping force to the disc,
   whereby the varying peripheral wall height serves to evenly distribute the clamping force applied by the plurality of screws to the disc.

23. A disc clamping system as claimed in claim 22 wherein the circumferentially varying peripheral wall height includes a minimum peripheral wall height, $H_{min}$ and a maximum peripheral wall height, $H_{max}$.

24. A disc clamping system as claimed in claim 23 wherein the circumferentially varying peripheral wall height varies in a linear manner from the minimum peripheral wall height to the maximum peripheral wall height.

25. A disc clamping system as claimed in claim 23 wherein the minimum peripheral wall height and maximum peripheral wall height are each located at multiple positions about the circumference of the disc clamp.

26. A disc clamping system as claimed in claim 25 wherein the circumferentially varying peripheral wall height varies in a linear manner between positions of minimum peripheral wall height and positions of maximum peripheral wall height.

27. A disc clamping system as claimed in claim 23 wherein the maximum peripheral wall height occurs at those locations on the perimeter wall radially outward from the positions of the screw holes, and the minimum peripheral wall height occurs at locations on the perimeter wall midway between the locations of maximum peripheral wall height.

28. A disc clamping system as claimed in claim 27 wherein the circumferentially varying peripheral wall height varies in a linear manner between positions of minimum peripheral wall height and positions of maximum peripheral wall height.

* * * * *